United States Patent [19]
Widmark et al.

[11] Patent Number: 5,504,804
[45] Date of Patent: Apr. 2, 1996

[54] PROVIDING INDIVIDUAL SUBSCRIBER SERVICES IN A CELLULAR MOBILE COMMUNICATIONS NETWORK

[75] Inventors: Jerker F. A. Widmark, Sundbyberg; Jörgen S. Lantto, Tullinge, both of Sweden

[73] Assignee: Telefonaktiebolaget LM Ericsson, Stockholm, Sweden

[21] Appl. No.: 182,834

[22] Filed: Jan. 19, 1994

[51] Int. Cl.⁶ .......................... H04M 11/00; H04Q 7/04
[52] U.S. Cl. ...................... 379/63; 379/59; 379/60; 379/62
[58] Field of Search .................... 379/63, 59, 60, 379/62; 340/825.44; 455/33.1, 54.1, 33.2, 56.1

[56] References Cited

U.S. PATENT DOCUMENTS

| | | | |
|---|---|---|---|
| 4,658,096 | 4/1987 | West, Jr. et al. | 379/63 |
| 4,698,839 | 10/1987 | DeVaney et al. | 379/59 |
| 4,776,003 | 10/1988 | Harris | 379/59 |
| 5,148,472 | 9/1992 | Freese et al. | 379/59 |
| 5,200,954 | 4/1993 | Teel, Jr. et al. | 455/33.1 |
| 5,210,787 | 5/1993 | Hayes et al. | 379/60 |
| 5,218,618 | 6/1993 | Sagey | 379/59 |
| 5,239,674 | 8/1993 | Comroe et al. | 379/59 |
| 5,251,249 | 10/1993 | Allen et al. | 379/59 |
| 5,260,987 | 11/1993 | Mauger | 379/60 |
| 5,309,501 | 5/1994 | Kozik et al. | 379/59 |
| 5,313,515 | 5/1994 | Allen et al. | 379/59 |
| 5,329,573 | 7/1994 | Chang et al. | 379/59 |
| 5,396,543 | 3/1995 | Breeson, Jr. et al. | 379/59 |

FOREIGN PATENT DOCUMENTS

| | | | |
|---|---|---|---|
| 0466078 | 1/1992 | European Pat. Off. | H04Q 11/04 |
| 2246269 | 1/1992 | United Kingdom | H04Q 7/04 |
| 92/17950 | 10/1992 | WIPO | H04Q 7/04 |
| WO93/18606 | 9/1993 | WIPO . | |

OTHER PUBLICATIONS

J. A. Audestad, "Application of Signalling System No. 7 to Public Land Mobile Networks: Status and Evolution", *Telektronikk* pp. 56–68, No. 1, 1990.

H. Sawada et al., "Inter–Network Roaming Based on Personal Digital Cellular Standards" *IEEE Global Telecommunications Conference* pp. 1944–1949, vol. 3, Nov. 29–Dec. 2, 1993.

(List continued on next page.)

*Primary Examiner*—Edward L. Coles, Sr.
*Assistant Examiner*—Fan Lee
*Attorney, Agent, or Firm*—Burns, Doane, Swecker & Mathis

[57] ABSTRACT

In a cellular mobile communications network, routing decisions pertaining to supplementary services are made by a home location register (HLR). For calling subscriber supplementary services, such as private numbering plans, a mobile services switching center (MSC) requests that the HLR perform the necessary routing decisions, and the HLR responds accordingly. For called subscriber supplementary services, such as call forwarding on busy, the MSC sends status information (such as the busy condition) to the HLR, and the HLR responds by determining supplementary call routing information, which is then sent to the MSC. Determining the supplementary call routing information may require that the HLR select from among several routing alternatives, in dependence on a condition such as time-of-day. In an alternative embodiment of called subscriber services, the HLR may recognize, upon initially being asked for a roaming number for a called subscriber, that a called subscriber condition exists that requires making a choice from among several possible routings. The HLR may solicit choice-determinative information from the MSC, which in turn prompts the calling subscriber for this information. The requested information may be returned to the MSC from the calling subscriber in the form of a dual tone multi-frequency (DTMF) signal. The MSC may convert the DTMF signal into a message containing the requested information, for transmission to the HLR.

37 Claims, 6 Drawing Sheets

OTHER PUBLICATIONS

J. Lantto, "Intelligent Network Architecture in the Japaneses Digital Cellular Standard—PDC", *Ericsson Review* pp. 145–149, No. 3, Sep. 1994.

International Search Report issued on Jun. 13, 1995 in connection with counterpart PCT Applicaiton No. PCT/SE 95/00009.

Bijan Jabbari, "Intelligent Network Concepts in Mobile Communications", IEEE Communications Magazine, pp. 64–69, published in Feb. 1992.

E. Fletcher Haselton, "Service–Creation Environments for Intelligent Networks", IEEE Communicaitons Magazine, pp. 78–81, published in Feb. 1992.

M. Ballard, E. Issenmann, "Digital Cellular Mobile–Radio System ECR900", European Transactions on Telecommunications & Related Technologies, Jan. 1990, pp. 17–30.

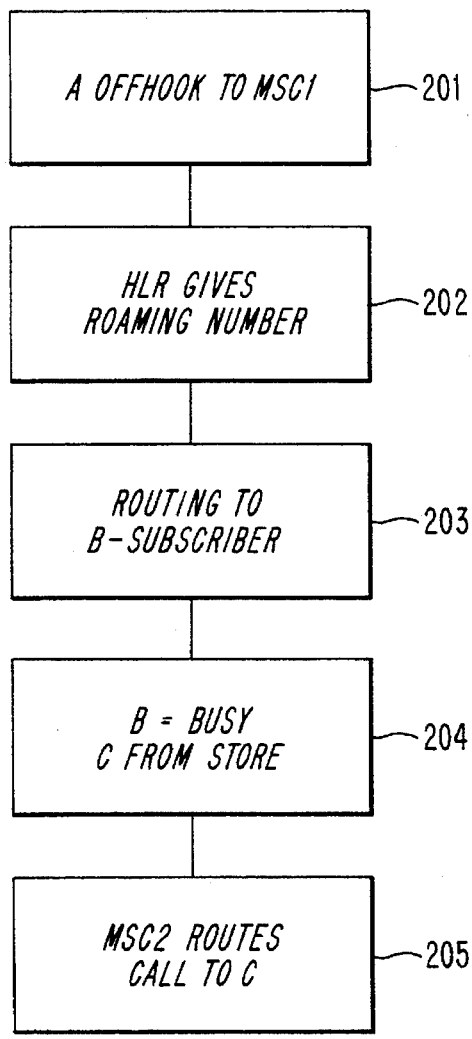
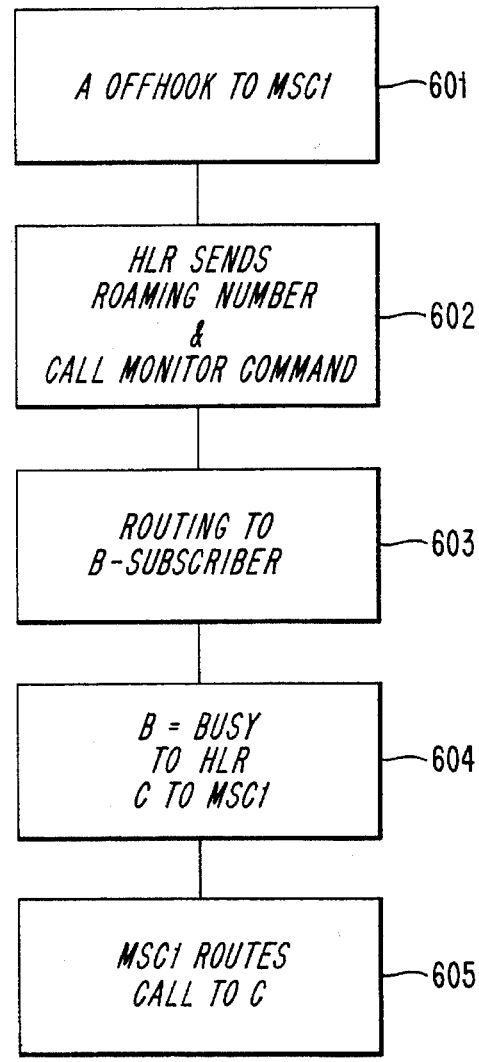
Fig. 2
Fig. 6

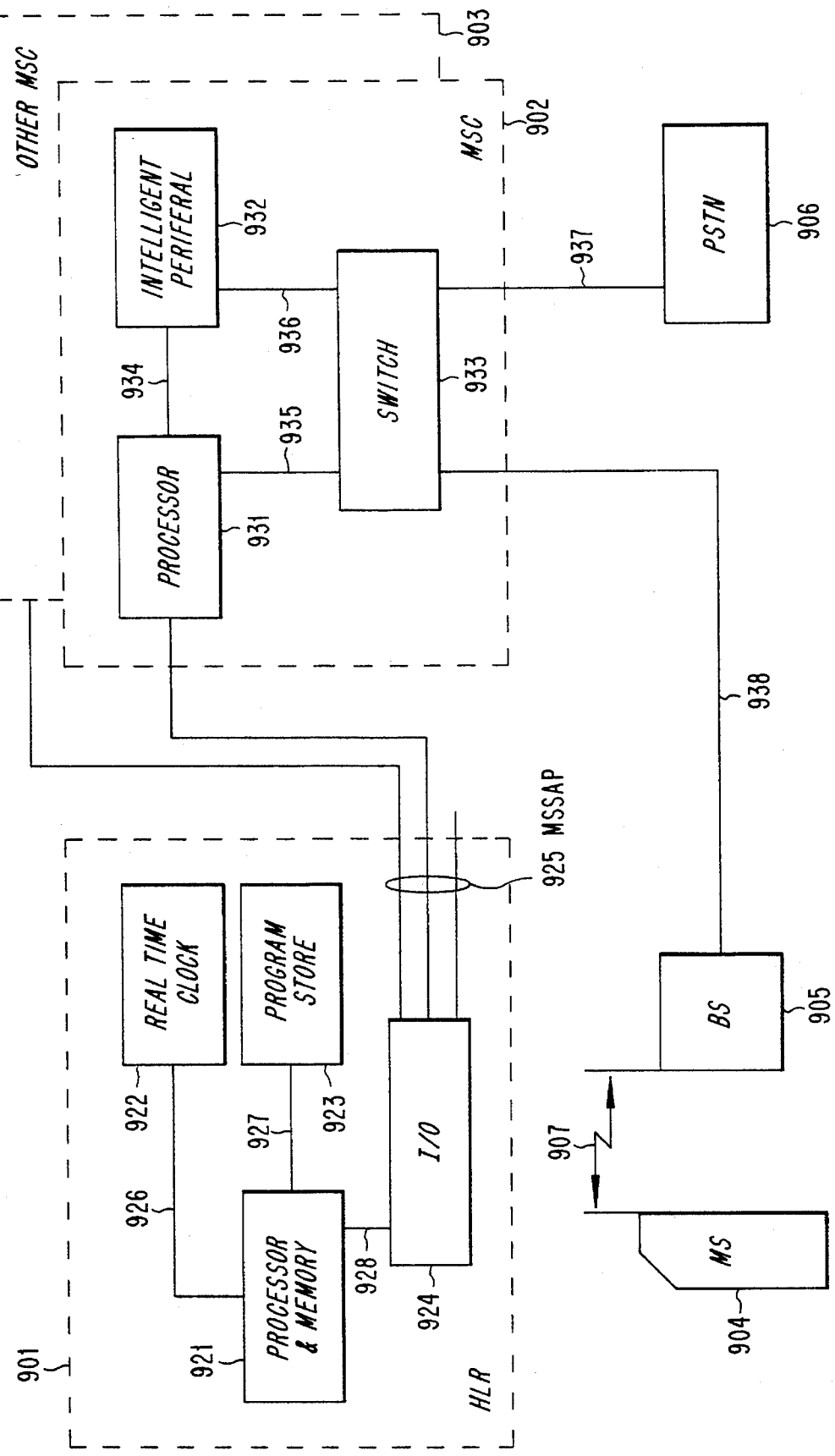

PROVIDING INDIVIDUAL SUBSCRIBER SERVICES IN A CELLULAR MOBILE COMMUNICATIONS NETWORK

BACKGROUND

The present invention relates to a system for providing individual supplementary subscriber services in a cellular mobile communications network, and more particularly to the use of a home location register for implementing individual supplementary subscriber services in a cellular mobile communications network.

A primary characteristic of a mobile communications system, such as a cellular telephone system, is the fact that subscribers to the system may move around. Accordingly, such systems are typically realized as a network of neighboring radio cells which together provide complete coverage of the area to be serviced. Each cell has a Base Station (BS) operating on a set of radio channels. The set of radio channels assigned to a given cell is different from the channels used in neighboring cells in order to avoid interference. A group of BS's is controlled by a Mobile services Switching Center (MSC), which controls calls to and from the Public Switched Telephone Network (PSTN), Integrated Services Digital Network (ISDN), and Public Land Mobile Network (PLMN). In a cellular telephone system, the role of the MSC is equivalent to that of the local exchange in the fixed network. That is, the MSC is responsible for handling tasks such as switching, routing and charging.

It is desirable to provide a mobile subscriber with a uniform set of services that he can use independent not only of his current location, but also independent of which operator is serving his current location. For this reason, well-known cellular systems such as the Nordic Mobile Telephone System (NMT), the Total Access Communication System (TACS), Advanced Mobile Phone System (AMPS), American Digital Cellular System (ADC), the Global System for Mobile Communication (GSM), and the Pacific Digital Cellular System (PDC) have all adopted standardized techniques for providing both basic as well as supplementary services to a roaming subscriber. As used in this specification, the term "basic service" refers to the ability of a communication network to simply establish a call. The term "basic service" will also refer here to those services, such as three party calling, which are available to all subscribers without requiring an individual subscription to a service. In contrast, the term "supplementary service" refers to all of those capabilities, in mobile as well as fixed networks, which go beyond those services which are considered "basic", and which do require an individual subscription before that service can be invoked. Individual supplementary subscriber services may be divided into two types: those which modify or supplement the process of originating a call (referred to here as "A-subscriber services"), and those which modify or supplement the process of terminating (i.e., receiving) a call, referred to here as "B-subscriber services"). A-subscriber services include, but are not limited to: barring of outgoing calls, and private numbering plans. B-subscriber services may be broken down into those which are invoked unconditionally, regardless of the status of the called subscriber or the network, and those whose invocation depends on a particular status or condition being present at the subscriber or in the network. Unconditional B-subscriber services include, but are not limited to: barring of incoming calls; call forwarding, unconditional. Conditional B-subscriber services include: call forwarding on busy; call forwarding on no reply; call forwarding on congestion; and call waiting. The operations and implementations of such cellular systems are well known in the art, and described in numerous publications. For example, the GSM standard is described as part of the ETSI standard. GSM specifications 02.82–02.89, 03.81–03.90, 04.10, and 04.80–04.90 are hereby incorporated by reference. ADC is based on the IS-54 standard. A detailed description of any of these well-known systems is beyond the scope of the present discussion. However, features of these systems which are pertinent to the present invention will be briefly outlined below.

In order to be able to place a call which terminates at a mobile station (MS) whose whereabouts may be continually changing, a data base is required in the network for keeping track of a particular MS. The above cellular systems have adopted the use of a data base called the Home Location Register (HLR), which is implemented as a node in the mobile radio communication network. The HLR for use in GSM is described in GSM specifications 09.02, 03.12 and 03.08, which are hereby incorporated by reference. When someone subscribes to receive service from an operator, such as any of the ones mentioned above, his subscription is entered in the HLR of that operator. The HLR contains subscriber information, such as supplementary services. Furthermore, the HLR stores information about the location of the MS, which information identifies the MSC serving the present location of the MS. This information is updated as the MS moves around by having the MS send location information to its HLR by means of an MSC.

Thus, when an MS roams into a new MSC area, it registers with that MSC, which in turn requests data about the MS from the HLR. At the same time, the HLR is informed of which MSC area the MS is presently located in. If, later on, the MS wants to make a call, the MSC will already have the information needed for the call set-up without having to interrogate the HLR each time.

In addition to basic subscriber services, individual supplementary subscriber services may also be supported. As mentioned above, these include, for example, call forwarding on busy, and private numbering plans (i.e., the MS's use of a personally selected "short number" for placing a call to a recipient whose full number is known and used by the system). The HLR typically plays a part in managing individual supplementary subscriber services in that, in addition to storing the present location of a roaming subscriber as described above, the HLR may also store subscriber categories and call forwarding numbers. The HLR updates subscriber category information and forwarding numbers (i.e., "C-numbers") in its memory when requested to do so by an authorized terminal (i.e., a terminal in the wirebound network with the associated subscription number, or a mobile radio terminal which has authenticated itself as the subscriber terminal). The HLR transmits selected parts of this information to an interrogating MSC on the occasion of registration of a roaming MS, and to a gateway MSC (GMSC) on the occasion of MS-terminated calls as explained in more detail below. However, no information is transmitted to an MSC merely because an MS is originating the call (e.g., a mobile station calling a wirebound subscriber).

In a typical network, then, A-subscriber services and conditional B-subscriber services are provided by the MSC, based on the subscriber categories provided to the VMSC by the HLR at the time of registration. There is no need for the MSC to again contact the HLR at the time of call setup. Also, in the prior art, the HLR is not capable of making conditional decisions because the standardized MSC-HLR interface does not include the ability to report subscriber status (e.g., busy, no answer, etc.) to the HLR, nor does it allow the conveyance of commands depending on such input. By contrast, unconditional B-subscriber services are invoked by the HLR because a call to a mobile subscriber always means that the first MSC contacted (i.e., the GMSC) will consult the HLR in order to learn the whereabouts of the subscriber. At this time, the HLR is in the best position to handle unconditional services such as barring an incoming call, or sending to the GMSC the C-number to which the call is to be unconditionally forwarded.

In order to standardize the means of communication between an HLR and an MSC, cellular communications systems have adopted the use of the Mobile Application Part (MAP) of the communications protocol known as CCITT Signaling System No. 7. Recommendations Q.701–707, Q.711–714 and Q.771–775 in CCITT's "Blue Book" are hereby incorporated by reference. There are different variants of the MAP protocols for use with correspondingly different cellular standards (GSM, ADC, PDC, etc.).

As new supplementary services are developed, it is necessary to be able to quickly incorporate them into existing mobile and non-mobile (i.e. "fixed") communications networks. In fixed networks, rapid service development is achieved by the use of a network definition known as Intelligent Network (IN). The idea of IN is to provide intelligent nodes in the network which may be consulted by other nodes in the network and updated from other nodes. Intelligent nodes consist of data processing equipment connected to other nodes only via data links for signaling. Intelligent nodes do not have switched user connections for speech or for user data transfer. Consequently, they may be accessed via data links only from particular other nodes in the network, such as service switching points (SSPs) in the PSTN. In accordance with the IN concept of functional entities, new services are introduced by adding new program modules in the IN-nodes, each corresponding to an IN functional entity. For example, a services control point (SCP) is the node in the network where most of the service logic resides. A services switching point (SSP), as described above, is the node that handles the switching functions necessary to enable the services invoked by the SCP.

These nodes correspond to functional entities which have been defined by the IN standards presented in CCITT Recommendation Q.1218, which is hereby incorporated by reference. The SCP is the hardware node corresponding to the service control function (SCF), and the SSP is the hardware node corresponding to the service switching function (SSF). Another function, the service data function (SDF), is also implemented in the SCP. It stores the service data needed for the SCF. Communication between the SSF and the SCF (and therefore, between the SSP and the SCP) is by means of a protocol called the Intelligent Network Application Part (INAP), which is also an application on CCITT no. 7.

The use of the IN network addresses the problem of how to rapidly implement new supplementary services in a fixed network. However, the IN network has been developed without consideration for the problem of how to provide these same new supplementary services in a cellular environment, in which subscribers are mobile. As a result, a number of proprietary solutions for use in the cellular environment now exist, producing a situation in which some supplementary services are implemented in the HLR, and other services are implemented in the SCP. Furthermore, management and implementation of most supplementary services within the cellular environment is distributed between the MSC and the HLR.

This approach impedes the rapid development of new services because the introduction of a supplementary service often not only requires a change to the HLR for management of the service and a change to the MSC for invocation of the service, but it also often requires a modification of the MAP protocol between the HLR and the MSC in order to permit the transferring of the supplementary services data between the HLR and the MSC. Consequently, the introduction of supplementary services in a cellular system requires a very long lead time, due to the number of nodes that must be updated with new software, and the fact that the operator usually wants the new service to be available throughout the entire network before being offered to the subscribers, so that all MSC's in the network must be updated before a new service is offered to the mobile subscribers.

As mentioned above, the IN solutions in the fixed network environment achieve rapid introduction of new services as a result of the functional division between the SCF and the SSF, in which the complete individual service logic resides in the SCF, and the SSF only performs generic switching functions (e.g., monitor and report call events, set up new leg, disconnect leg) under the direction of the SCF. However, the IN solution cannot also be applied to the cellular environment because there is a conflict between the operation strategies of the SCF and the HLR, the SDF and the HLR and the SSF and the MSC. That is, the SCF performs the same functions as the HLR, but it uses a different implementation and different interfaces. The same may be said of the relationship between the SDF and the HLR, as well as between the SSF and the MSC. For example, the SCF is meant to control all services in an intelligent network. However, this arrangement is violated by the cellular standards which always require that the HLR contain the information that is necessary for invoking a number of services, such as call forwarding unconditional and barring of incoming calls. Similarly, in the intelligent network the SDF serves as the data storage function for the subscriber, whereas subscriber data in a cellular network is always stored in the HLR.

For coordinating services between the mobile network and the fixed network, there exist only the switched connections between the PSTN and the PLMN, i.e., between the End Office/Tandem (EO/T), which is a unit in the PSTN, and the MSC which is the corresponding unit in the PLMN. The EO/T has an interface to the SCP which stores vital service information for the PSTN subscribers. Similarly, as described above, the MSC has an interface to the HLR which stores location and service information for the PLMN subscribers. According to the present state of the art, the PSTN cannot access the HLR and the PLMN cannot access the SCP. Consequently, if a subscriber requests a service that is available in the other network but not in his own, providing this service is only possible by routing the call to the other network, because signaling associated with these services is not provided between the networks.

To illustrate the solutions presently being applied to provide supplementary services to mobile subscribers, two examples will now be presented. The first of these examples will explain how the supplementary service known as "call forwarding on busy" has been implemented in the prior art. The purpose of the "call forwarding on busy" service is to allow a called subscriber to designate an alternative number which will terminate an incoming call in the event that the subscriber's primary number is already in use (i.e., busy). The following description, then, serves as an example of the prior art implementation of a supplementary service which supplements the ability to terminate a call. It will now be described with reference to FIGS. 1 and 2.

In step 201 a wirebound subscriber 101 (A=originating subscriber) calls a cellular subscriber 103 (B=called subscriber), and the call is set up from the calling subscriber to MSC1 104 through connection 105, PSTN 109, connection 106. It will be recognized that, in this example, the calling subscriber could alternatively be a cellular radio subscriber 102. However, for the remainder of this description, reference will be made only to the wirebound subscriber 101.

In step 202 the MSC1 104 utilizes the MAP-interface 108 to ask the HLR 107 about the present location of cellular subscriber 103 and gets back the cellular subscriber's roaming number.

In step 203 the MSC1 104 uses the roaming number to route the call to the cellular subscriber 103 via connection 111, PSTN 109, connection 112 and MSC2 113.

In step 204, MSC2 113 detects that the called cellular subscriber 103 is busy. In response, logic means within the MSC2 113 cause it to read in its category store (which was updated via MAP-interface 117 when the B subscriber roamed to the region of MSC2) that this particular called subscriber has "call forwarding on busy" to a particular C number given in the store.

In response to this determination, the MSC2 113, in step 205, routes the call to the C terminal 114 via connection 115, the PSTN 109 and connection 116, thereby completing the supplementary service.

It can be seen from this example that the information for originally routing the call is provided by the HLR 107, but that the logic decision of call forwarding, which is also a routing decision, is made by MSC2 113. If the called cellular subscriber 103 were to request that call forwarding be turned on or off, this would require updating not only the HLR 107, but also the visited MSC2 113. It would be preferable to have to update only one node.

In the second example, the prior art implementation of a "private numbering plan" service is illustrated. In this service, a calling subscriber places a call by using only a short number which the calling subscriber associates with the called subscriber. The calling subscriber relies on the service provider to substitute the full number for the called subscriber and correctly route the call. This supplementary service has been selected as an example because it illustrates the type of supplementary service which supplements the ability to originate a call. The prior art implementation of this supplementary service will now be described with reference to FIGS. 3 and 4.

In step 401, a calling mobile radio subscriber 301 (A=originating subscriber) calls a cellular subscriber 302 (B=called subscriber) using a short number out of a private numbering plan subscribed to and stored in the SCP 303.

In step 402, the MSC1 304 reads in its category store (which was updated via the MAP-interface 305 when the A subscriber roamed to the region of MSC1 304) that the calling mobile radio subscriber 301 has a "private numbering plan" stored in SCP 303. In response, the MSC1 304 routes the call to SSP 306 by way of connection 307, the PSTN 309, and connection 308. SSP 306 was selected because it is the switch associated with SCP 303.

In step 403, SSP 306 asks the SCP 303, via the interface 311 (the INAP), to translate the short number of B. In response, the SSP 306 gets back the actual number which may, for example, be a mobile radio number.

In step 404, SSP 306 routes the call to the MSC2 314 via connection 312, PSTN 309, and connection 313.

In step 405, MSC2 314 asks HLR 318, via the MAP-interface 319, about the location of the called cellular subscriber 302. In response, the HLR 318 provides the MSC2 314 with a roaming number for the called cellular subscriber 302. The MSC2 314 then routes the call to the called cellular subscriber 302 by way of connection 316 and MSC3 315, thereby completing the supplementary service.

It can be seen from this example that the information for routing the call to SSP 306 is provided in advance by the HLR 318 when it sends a category to MSC1. Furthermore, the number translation and information for routing the call back to the cellular network is provided by the SCP 303. Then, the routing of the call to the called cellular subscriber 302 is performed by HLR 318 giving a roaming number to MSC2 314. In addition to the disadvantage caused by unproductive loops (i.e., extra connections and points of decision-making in the routing of the connection), it is impossible for the calling subscriber 301 to change his private numbering using his mobile terminal, because the required interface is not defined.

SUMMARY

It is therefore an object of the present invention to provide a mobile communications system which provides for the rapid incorporation of new supplementary services.

It is a further object of the present invention to provide a procedure for communicating between the MSC and HLR whereby status information is communicated from the MSC to the HLR at the time of call setup, and wherein the HLR uses the information from the MSC to make a logical decision regarding the setup of the call and returns this decision to the MSC.

It is a still further object of the present invention to provide a procedure for originating calls from mobile cellular subscribers, wherein the MSC, in response to detecting that the calling subscriber is of a particular category (KA), consults the HLR, reporting at least the subscriber identity to the HLR.

It is yet a further object of the present invention to provide a procedure for terminating calls to a mobile cellular subscriber wherein an MSC (normally the GMSC), upon requesting a roaming number from the HLR, receives a command from the HLR to monitor events, such as the called mobile cellular subscriber being busy or not replying, during the call set-up to the called mobile cellular subscriber, and to notify the HLR of any occurrence of such events.

It is a further object of the present invention to provide a procedure whereby the HLR may ask the connected subscriber for information, preferably by voice prompting, and wherein an answer is returned to the HLR, preferably by using a Dual Tone Multi Frequency (DTMF) signal for communicating the information to the MSC, and then converting the information into a message for transmission to the HLR.

It is yet another object of the present invention to provide an HLR performing the above indicated functions.

It is another object of the present invention to provide an MSC performing the above indicated functions.

In accordance with one aspect of the present invention, the foregoing and other objects are achieved in a mobile communications system requiring only that a single intelligent node be consulted at call setup for a particular calling subscriber subscribing to individual originating services and that no more than one intelligent node be consulted at call setup for that particular called subscriber subscribing to individual terminating services.

In accordance with another aspect of the invention, a calling subscriber supplementary service may be implemented in a mobile communications system comprising a home location register (HLR) coupled to a mobile services switching center (MSC) by sending a supplementary service category for the calling subscriber from the HLR to the MSC. When the MSC detects initiation of a call from the calling subscriber and presence of the supplementary service category for the calling subscriber, the MSC sends a supplementary service request to the HLR. The supplementary service request is received in the HLR, and in response thereto, the HLR determines call routing information in accordance with supplementary service parameters. This determination may require, for example, that a subscriber's short number from a private numbering plan be translated into a full number which can be used by the MSC for routing the call. The call routing information is then sent from the HLR to the MSC.

In accordance with another aspect of the invention, a called subscriber supplementary service may be implemented by detecting, in the MSC, initiation of a call from a calling subscriber to a mobile called subscriber. In response, the MSC sends the HLR a request for a roaming number corresponding to the called subscriber. In response to this request, the HLR sends the MSC the roaming number and a command to monitor the progress of the call. The MSC uses the roaming number to route a call from the calling subscriber to the called subscriber. The MSC then detects a status condition and presence of the command to monitor the progress of the call, the status condition being indicative of non-completion of the call from the calling subscriber to the called subscriber. The status condition may indicate, for example, that the called subscriber is busy. In response, the MSC sends to the HLR a supplementary service request indicative of the status condition. This supplementary service request is received by the HLR, which may determine, for example, that the called subscriber is entitled to a call forwarding on busy supplementary service. Consequently, the HLR determines supplementary call routing information in accordance with supplementary service parameters. This may simply consist of providing the alternative routing information for use when the called subscriber is busy. Alternatively, the supplementary service parameters may require that a selection be made from among several routing alternatives, in dependence, for example, on the time-of-day. After it has been determined, the HLR sends the supplementary call routing information to the MSC.

In yet another aspect of the invention, a called subscriber supplementary service may be implemented by detecting, in the MSC, initiation of a call from a calling subscriber to the called subscriber, which is normally a mobile subscriber. In response, the MSC sends the HLR a request for a roaming number corresponding to the called subscriber. In responding to this request, the HLR detects an availability condition for the called subscriber. For example, the availability condition may indicate that the called subscriber is in a meeting, and is therefore to receive only an important call, and that an unimportant call is to be routed to an alternative destination. Upon detecting this availability condition, the HLR sends a request to the MSC for information that will determine, at least in part, which routing information is to be selected. For example, the requested information may indicate whether the calling subscriber is initiating the important call or the unimportant call. The MSC may determine this information by sending suitable voice prompts to the calling subscriber, who may respond to the MSC by activating keys on the keypad of his telephone to produce corresponding DTMF signals which are received by the MSC. The HLR then receives, from the MSC, information responsive to the information request. The HLR uses the received information to determine supplementary call routing information in accordance with supplementary service parameters. It then sends the supplementary call routing information to the MSC, which uses the supplementary call routing information to route the call from the calling subscriber accordingly.

BRIEF DESCRIPTION OF THE DRAWINGS

The objects and advantages of the invention will be understood by reading the following detailed description in conjunction with the drawings in which:

FIG. 2 is a flow chart of a prior art technique for implementing the call forwarding on busy supplementary service in a mobile communications network.

FIG. 6 is a flow chart for implementing the call forwarding on busy supplementary service in a mobile communications network in accordance with the present invention.

FIG. 9 is a block diagram of a mobile communications network in accordance with the present invention.

DETAILED DESCRIPTION

Figure 1:
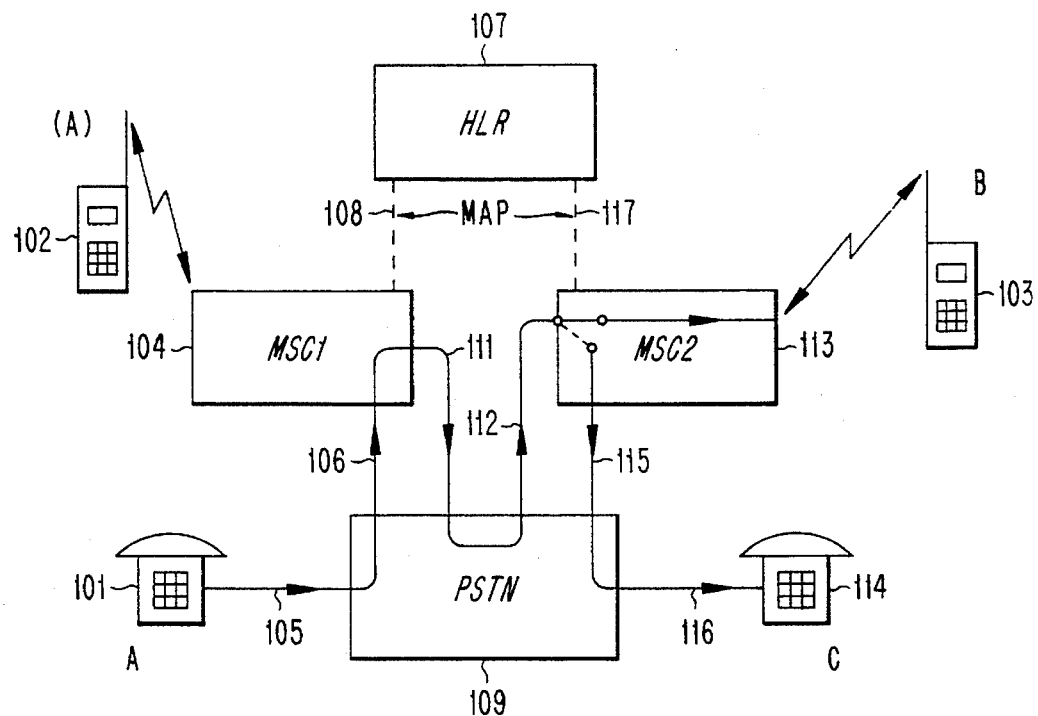
FIG. 1 is a diagram of a prior art technique for implementing the call forwarding on busy supplementary service in a mobile communications network.

In contrast to the prior art solution of relying on the IN network architecture to provide the necessary support for new services within a mobile communications network, a mobile communications network in accordance with the present invention provides these new services within the existing mobile communications architecture. That is, the HLR is enhanced with new service capabilities, and the MSC takes a more generic service switching role without containing any service logic for new individual supplementary services. It should be the role of the HLR to store and administer all subscriber data for individual mobile subscribers (such as data relating to voice mail services), and to contain all of the logic for implementing specific aspects of the individual call set-up phase for new supplementary services.

Compared to dividing the responsibility for handling new subscriber services between the HLR and different peer entities, such as the SCP, a number of advantages are obtained by the new approach of concentrating the handling of mobile subscriber data, as well as the invocation of mobile subscriber individual services, in the HLR. Some of these advantages are described as follows:

Service management:

The term "service management" refers, among other things, to the installation of new supplementary services for mobile cellular subscribers in the intelligent nodes of the network. Under the new approach described here, this is simplified because this installation only needs to be done in the HLR.

By comparison, the old approach of distributing responsibility for invoking services between different nodes in the network, such as the HLR and the SCP, requires more time and effort to install new supplementary services. Therefore one of the main objectives with the new network architecture is to enable subscription management for mobile subscribers to be focused in a single node, namely the HLR, for all services.

Service interaction:

In the existing cellular standards, supplementary service for a mobile subscriber is administered in the HLR. That is, the HLR must either invoke the service itself, such as with the call forwarding unconditional service, or else it must at least maintain information about the services that a subscriber is entitled to (i.e., the subscriber categories), so that that information can be communicated to an MSC at the time of location registration.

In the event that a supplementary service for a mobile subscriber would be invoked by both the SCP and the HLR, the service interaction problem in the prior art would have to be solved on a network level, thus requiring very complex solutions. An example of this is the previously described prior art implementation of the private numbering plan service, in which the HLR must be responsible for routing the call to the SSP, and the SSP/SCP is then responsible for first translating the short number into a full number, and then routing the call to the B-subscriber.

By contrast, the presently described solution, wherein all services specific for a particular mobile subscriber are handled by a single node (the HLR), eliminates the service interaction problem so that simpler implementation solutions can be used. An example will be presented below, in which under the new approach, invocation of the private numbering plan service is entirely handled by the HLR, without the need for routing to an SSP.

User service control:

Today the supplementary service included in the cellular networks can be controlled by the mobile subscriber using special procedures from the mobile station.

Since these procedures are handled in the network by the HLR it will still be possible to utilize the same support that exists today for user control of the new mobile subscriber services.

It is essential that the subscriber have means to control the supplementary services that he/she has subscribed to, otherwise these services will not be used in practice. The method of the present invention, whereby all mobile subscriber specific services are handled in the HLR, means that user control will be possible for all supplementary services, both existing and future.

Protocol between HLR and MSC

To incorporate this new network architecture into an existing cellular network, a new communication protocol is introduced between the MSC and the HLR. This new protocol is called a Mobile Supplementary Services Application Part (MSSAP). The MSSAP is preferably a protocol which replaces the existing MAP protocol between the MSC and the HLR. The MSSAP will perform all of the operations which are currently performed by the existing MAP protocol, and in addition, will permit the new communications described below. The MSSAP is used for communication between the MSC and the HLR at mobile terminated calls as well as at mobile originated calls. Those having ordinary skill in the art of communications protocols will readily be capable of implementing the MSSAP protocol in accordance with the description which follows.

The MSSAP contains the necessary functions for allowing the HLR to obtain all the information it needs to invoke supplementary services. The MSSAP also contains procedures similar to the INAP interface between the SSP and the SCP, in order to enable the MSC to have a more generic service switching function than it has in prior art systems. Means are also provided for using the MSSAP as a communication link between the MSC and the HLR for mobile originated calls, a feature which is not possible with the prior art MAP standards.

In accordance with the present invention, the MSSAP provides for communicating the following information:

Commands to transmit voice messages from the MSC to the subscriber. This is used when the HLR, desiring to send a particular voice message (e.g., a "prompt") to the subscriber, commands the MSC to connect to an intelligent peripheral (IP) that actually generates the voice prompt (selected from a number of stored voice messages) to be transmitted to the subscriber.

Transmitting answers received by the MSC from the subscriber to the HLR in the form of messages. The answers may be communicated to the MSC from the subscriber in the form of a Dual Tone Multi-Frequency (DTMF) signal. However, the MSC must convert this into a message that is suitable for transmission to the HLR via the MSSAP.

Transmitting called subscriber status (e.g., busy, no reply, not reachable) and network conditions (e.g., "congestion") to the HLR. The MSC would send this information to the HLR in response to detecting the presence of a command, previously received from the HLR, instructing the MSC to monitor and report such conditions.

Transmitting A-subscriber parameters (e.g., A-number, terminal type, etc.) from an MSC to the HLR during call origination. This transmission would occur in response to the subscriber having a particular A-category.

Transmitting answers (e.g., full number of a private numbering plan) from the HLR to the MSC as a response to the MSC's transmission of A-subscriber parameters.

Transmitting requests from the HLR to the MSC to set up a call to a specified destination.

Transmitting requests from the HLR to the MSC to connect or disconnect the different parties involved in a call to/from each other.

The various inventive features of the present invention, in which all substantive subscriber service decisions are made by the HLR, with the MSC only having to decide whether or not the HLR should be consulted for a subscriber service decision, and without having to rely on nodes within the wirebound network making any of these decisions, will now be illustrated with reference to several examples. In each of these, the described steps are preferably implemented by computer programs. Those of ordinary skill in the art of computer programming in communications systems environments will readily be able to write suitable programs for implementing the present invention from the description which follows.

Figure 5:
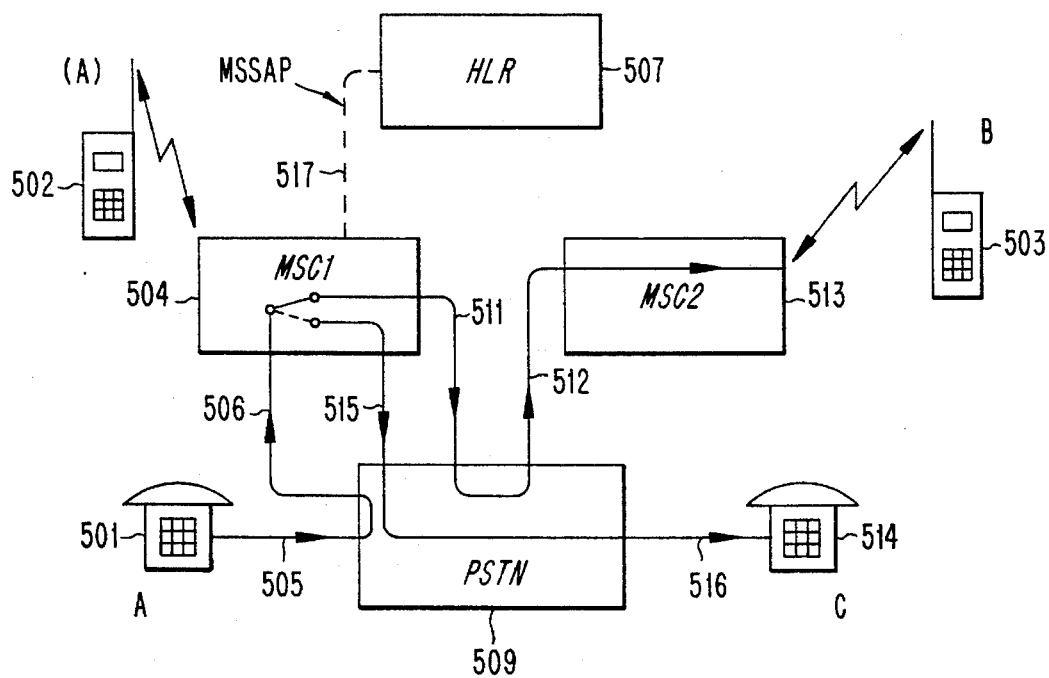
FIG. 5 is a diagram of a mobile communications network in which the call forwarding on busy supplementary service has been provided in accordance with the present invention.

Referring now to FIGS. 5 and 6, the inventive solution to the problem of providing the "call forwarding on busy" service will now be presented. This supplementary service is presented merely as one illustration of how a service that supplements the ability to terminate a call would be implemented in accordance with the present invention. Those having ordinary skill in the art will readily appreciate how the principles shown in the following example can be applied to other supplementary services.

In step 601 a wirebound calling subscriber 501 (A=calling subscriber) places a call to a cellular subscriber 503 (B=called subscriber) and the call is set up from the calling subscriber to MSC1 504 via connection 505, PSTN 509, and connection 506. Although the assumption in this example is that the call originates with a wirebound subscriber, it will be apparent that the same methods to be described could also be applied when the originating subscriber is a calling cellular radio subscriber 502.

In step 602 the MSC1 504 asks the HLR 507 via the MSSAP 517 about the present location of the called cellular subscriber 503. In response, the HLR 507 provides the MSC1 504 with a roaming number corresponding to that called cellular subscriber 503. In addition, the HLR 507, after determining that the called cellular subscriber 503 is entitled to receive the "call forwarding on busy" service, gives the MSC1 504 a "call monitor command", which instructs the MSC1 504 to monitor the progress of the call, and to report the existence of any status conditions, such as "busy" or "no reply".

In step 603 MSC1 504 uses the roaming number to route the call to the called cellular subscriber 503 via connection 511, PSTN 509, connection 512 and MSC2 513.

In step 604 MSC2 513 detects that the called cellular subscriber 503 is busy and sends this B-subscriber state back to MSC1 504 (e.g., by transmission of an ISDN User Part (ISUP) message) over the path which has been established between MSC2 513 and MSC1 504. After receiving this B-subscriber status information and detecting the presence of the previously received "call monitor command", the MSC1 504 responds by informing the HLR 507 of the busy status, via a supplementary service request. This communication also takes place via the abovedescribed inventive extension of the MAP interface, called MSSAP 517. In response to the supplementary service request, the HLR 507 again ascertains that the called cellular subscriber 503 is entitled to receive the "call forwarding on busy" service, and subsequently determines, in accordance with the supplementary service parameters associated with the call forwarding on busy service, the particular C number to which the call should be routed. It then returns a message to the MSC1 504 via MSSAP 517 indicating the determined particular C number.

In step 605 MSC1 504 routes the call to the C terminal 514 via the connection 515, PSTN 509 and the connection 516, thereby completing the supplementary service.

Thus in accordance with the present invention, the HLR 507 was solely responsible not only for determining the initial roaming number for the called cellular subscriber, but also for determining that the MSC1 504 should establish a connection to the C terminal 514 upon receiving a message that the called cellular subscriber 503 was busy.

The next illustrative example of the present invention concerns the implementation of a private numbering plan service for a mobile subscriber. In this service, a calling subscriber places a call by using only a short number which the calling subscriber associates with the called subscriber. The calling subscriber relies on the service provider to substitute the full number for the called subscriber and correctly route the call. This supplementary service is being presented merely as one illustration of how a service that supplements a mobile subscriber's ability to originate a call would be implemented in accordance with the present invention. Those having ordinary skill in the art will readily appreciate how the principles shown in the following example could be applied to other supplementary services.

Figure 7:
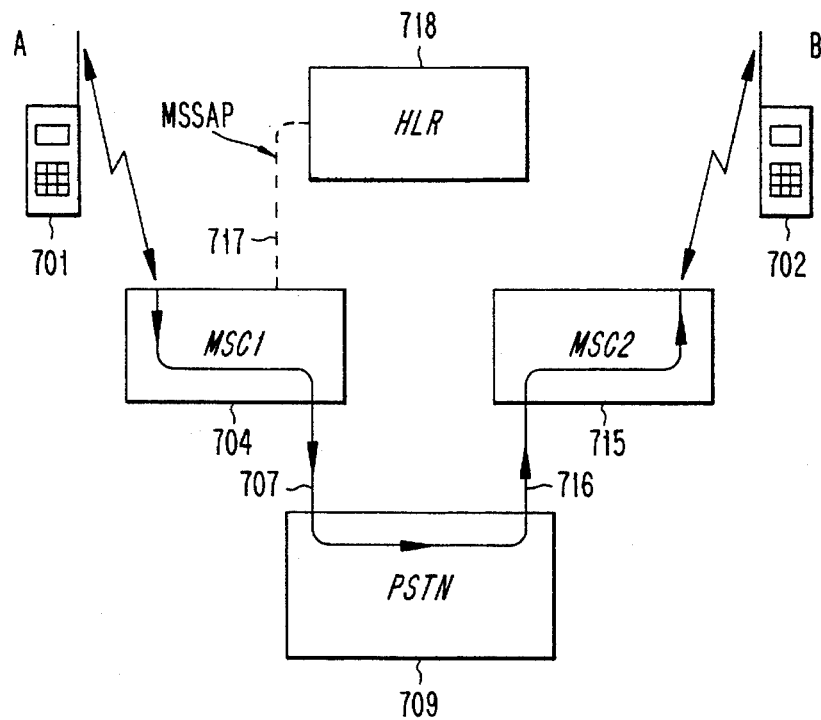
FIG. 7 is a diagram of a mobile communications network in which the private numbering plan supplementary service has been provided in accordance with the present invention.
Figure 4:
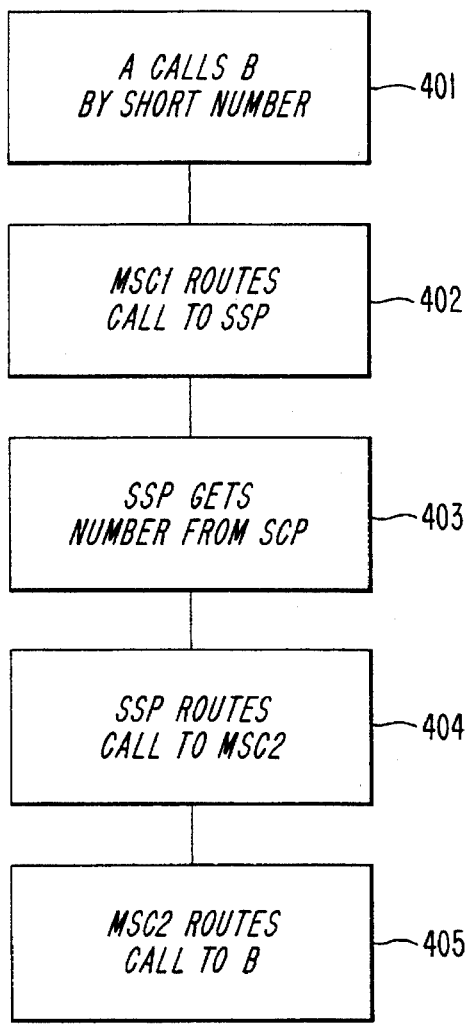
FIG. 4 is a flow chart of a prior art technique for implementing the private numbering plan supplementary service in a mobile communications network.
Figure 8:
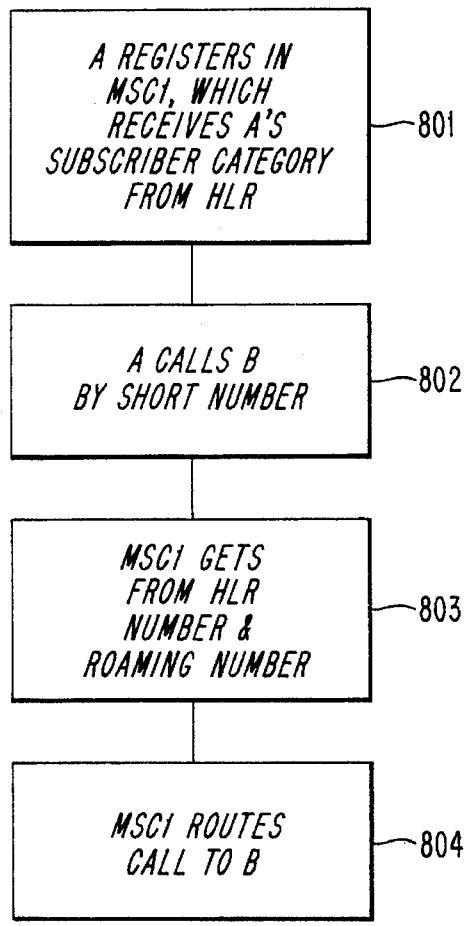
FIG. 8 is a flow chart for implementing the private numbering plan supplementary service in a mobile communications network in accordance with the present invention.

Referring now to FIGS. 7 and 8, in step 801 a mobile radio subscriber 701 roams into the area served by MSC1 704, and registers its location there. As part of location registration, the MSC1 704 receives from the HLR 718 via the MSSAP interface 717 the subscriber categories for the mobile radio subscriber 701. In accordance with the present invention, the received subscriber categories include a new category, here designated "KA", which tells the MSC1 304 that it is to contact the HLR 718 whenever this subscriber originates a call (A=originating subscriber), even if that call is to be routed to a terminal in the wirebound network (i.e., even if the called terminal is not a mobile subscriber).

In step 802 the originating mobile radio subscriber 701 calls a cellular subscriber 702 (B=called subscriber) using a short number out of a private numbering plan subscribed to and stored in the HLR 718.

In step 803, the MSC1 704, recognizing that the calling cellular subscriber 701 is a category KA subscriber, uses the MSSAP interface 717 to contact the HLR 718, informing the HLR 718, via a supplementary service request, of the calling cellular subscriber's request and identity. The HLR 718 recognizes that the calling cellular subscriber 701 is using a private "short number", and translates this number into a full number suitable for routing the call in the network, in accordance with the supplementary service parameters which are associated with the private numbering plan supplementary service. Also in step 803, after the MSC1 704 has received the full number of the called cellular subscriber 702, it again uses the MSSAP interface 717, this time transmitting to the HLR 718 the full number of the called cellular subscriber 702 along with a request that the HLR 718 return the called cellular subscriber's roaming number. In response, the HLR 718 determines the roaming number of the called cellular subscriber 702, and returns this information to the MSC1 704 by means of the MSSAP 717.

In step 804 MSC1 704 uses the full number and the roaming number to route the call to the called cellular subscriber 702 via the connection 707, PSTN 709, the connection 716, and MSC2 715.

Figure 3:
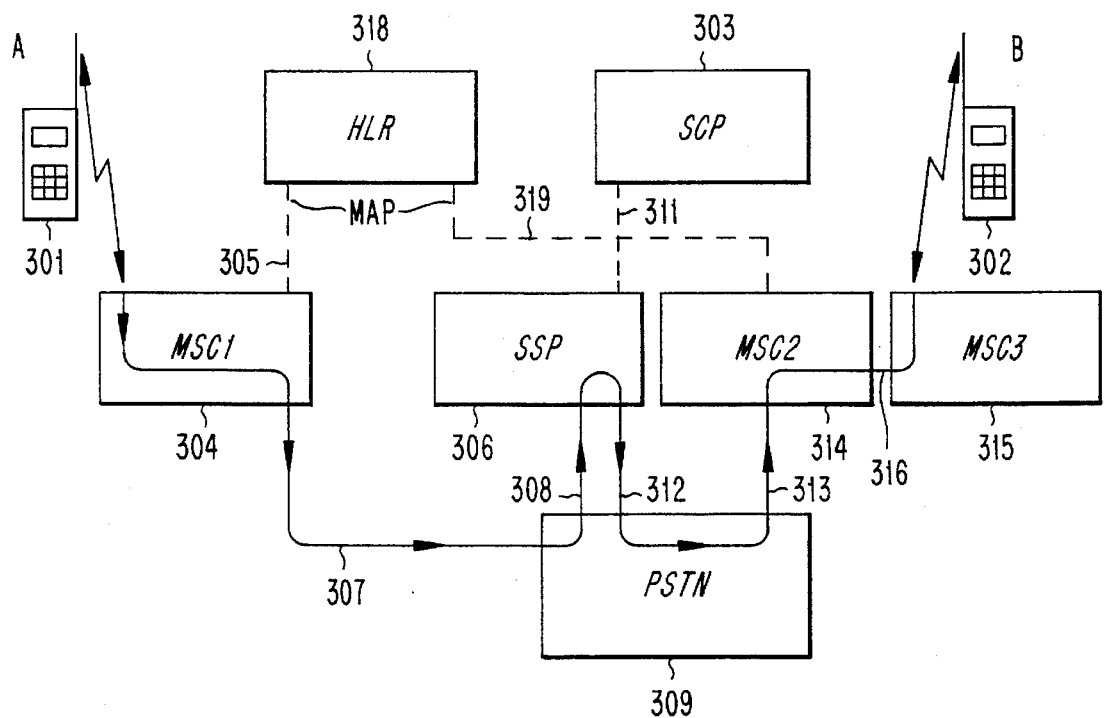
FIG. 3 is a diagram of a prior art technique for implementing the private numbering plan supplementary service in a mobile communications network.

In order to simplify the explanation, an assumption in the above example was that both the A-subscriber and the B-subscriber have the same HLR. However, this may not be the case. In the event that subscribers A and B have corresponding home location registers HLR-A and HLR-B, then it is necessary for MSC1 to consult both HLRs at the time of call origination. That is, the MSC1 would first contact the HLR-A, using the MSSAP interface, in order to have the short number translated to a full number. Then, the MSC1 would contact the HLR-B, via the MSSAP interface, in order to obtain the roaming number of the B-subscriber. Note that in this case, two intelligent nodes are consulted for one call set up. However, this is done via signalling links without routing the call in loops between PLMN and PSTN as was necessary in the prior art (see FIG. 3).

A mobile communications network in accordance with the present invention will now be described with reference to FIG. 9. A cellular mobile radio station 904 communicates with a base station 905 via a radio connection 907. The base station 905 is, in turn, connected to the switch 933 of an MSC 902. Other MSC's similarly exist in the system, as represented by the other MSC 903. However, this description will focus on the MSC 902, which is representative of the other MSC's in the system.

The switch 933 is coupled to an external PSTN 906 by means of the connection 937. Within the MSC 902, the switch 933 is coupled to a processor 931 by means of connection 935, and to an intelligent peripheral 932 by means of connection 936. The connection 935 permits the processor 931 to control the operation of the switch 933. The intelligent peripheral 932 stores voice messages, or prompts, which may be played to a subscriber by appropriate routing through the switch 933. A connection 934 between the intelligent peripheral 932 and the processor 931 permits the processor 931 to control the operation of the intelligent peripheral 932.

The processor 931 in the MSC 902 is coupled, by means of connection 925, to input/output (I/O) logic 924 located in the HLR 901. The I/O logic 924 is similarly coupled to other MSC's in the system. Communication on the connection 925 uses the MSSAP protocol of the present invention. The processor 921 is preferably responsible for maintaining the proper protocol in the HLR 901. In a preferred embodiment, the processor 921 is also capable of communicating by means of the standardized MAP protocol, in order to maintain compatabilty with other MSC's which have not been updated to use the MSSAP protocol of the present invention.

The I/O logic 924 is coupled, by means of connection 928, to a processor 921. The processor preferably also includes a data memory for storing operands used during processing. The HLR 901 also includes a program store 923 coupled to the processor 921 by means of connection 927, and a real time clock 922 coupled to the processor 921 by means of connection 926.

The above configuration permits network status information to be routed through the MSC 902 to the HLR 901, which can then make decisions by means of the processor 921. The mobile radio station 904 may transmit data to the base station 905, which in turn relays that data to the MSC 902 whose processor 931 again relays that data to the HLR 901. The processor 921 of the HLR 901 can then take appropriate actions on the basis of the received data. An example of this will be illustrated below.

The MSC 902 is also capable of making decisions to the extent that it recognizes the new subscriber category (i.e., KA) and the call monitor command, both described here, and takes appropriate action. In particular, the new subscriber category KA tells the MSC 902 that the HLR 901 must be consulted whenever a corresponding subscriber attempts to originate a call. This permits the HLR 901 to handle such services as the private numbering plan described in detail above. The new call monitor command tells the MSC 902 that it must monitor and report certain called subscriber or network status information that may occur during an attempted routing of a corresponding call. This permits the HLR 901 to process such services as the call forwarding on busy service described in detail above.

Figure 10:
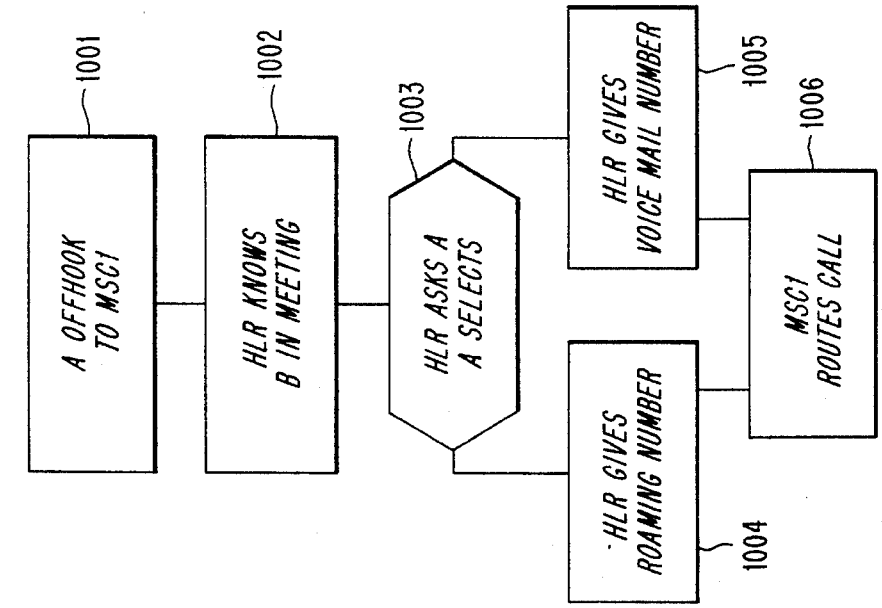
FIG. 10 is a flow chart of the "interactive call termination supplementary service", in accordance with the present invention.

In accordance with the present invention, the mobile communications system is capable of easily providing more complicated services. For example, an interactive call termination supplementary service will now be described with reference to FIG. 10. This service is useful, for example, if a B-subscriber is in a meeting and wants to be able to receive important calls, but would like all other calls to be routed to a voice machine. The calling A-subscriber is therefore to be given the option of having his call put through to the B-subscriber, or else having it routed to the voice machine so that he can leave a message.

The implementation of this service in accordance with the present invention will now be described. Referring to block 1001 in FIG. 10, the A-subscriber attempts to place a call to the B-subscriber. Since the B-subscriber is a mobile cellular subscriber, the call is first routed to MSC1. As explained in previous examples, the MSC1 accesses the HLR, by means of the new MSSAP interface, in order to obtain the roaming number of the B-subscriber. However, in block 1002, the HLR detects in its data base that an availability condition exists for the B-subscriber, such as the fact that the B-subscriber is currently in a meeting (the B-subscriber had previously informed the HLR of this). Therefore, in block 1003, instead of simply transmitting the roaming number to the MSC1 over the MSSAP interface, the HLR uses a feature of the new MSSAP interface to tell the MSC1 to send a voice prompt to the A-subscriber. The voice prompt informs the A-subscriber of the options to either connect directly to the B-subscriber if the call is important, or else to connect to the B-subscriber's voice mail number. The A-subscriber makes a selection by, for example, using the keypad on his telephone to send a selected DTMF signal through the base station to the MSC1. The MSC1 then converts the requested information contained in the DTMF signal into a message for transmission back to the HLR over the MSSAP. Depending on the A-subscriber's response, the HLR uses the MSSAP interface to send either the B-subscriber's roaming number (block 1004), or else the voicemail number to the MSC1. In block 1006, the MSC1 uses the number received from the HLR to finish routing the call.

Another more complicated supplementary service that can easily be implemented in the mobile communications system in accordance with the present invention is the "time-dependent call forwarding supplementary service." This service allows a subscriber to designate different forwarding numbers (i.e., "C-numbers") for use at correspondingly different times of the day. Such a service cannot accurately be provided in prior art systems because the C-number in those systems is provided to the MSC2 at the time that the B-subscriber registers there, which may be much earlier than the time that the service is actually invoked.

Figure 11:
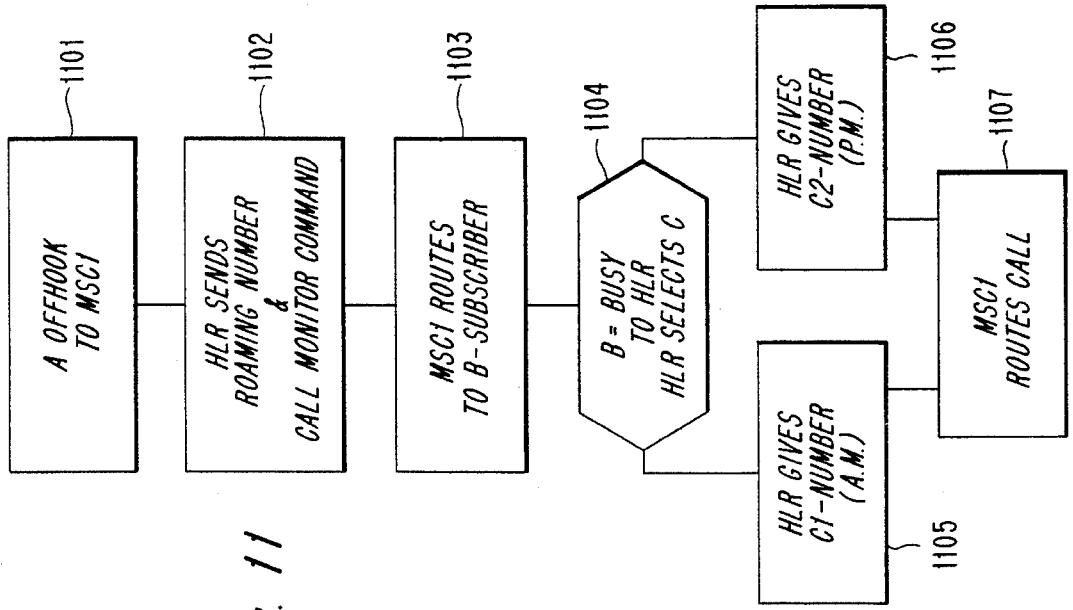
FIG. 11 is a flow chart of the "timedependent call forwarding supplementary service", in accordance with the present invention.

The implementation of this service in accordance with the present invention will now be described with reference to FIG. 11. In block 1101, the A-subscriber attempts to place a call to the B-subscriber. Since the B-subscriber is a mobile cellular subscriber, the call is first routed to MSC1. As explained in previous examples, the MSC1 accesses the HLR, by means of the new MSSAP interface, in order to obtain the roaming number of the B-subscriber. In block 1102, the HLR again uses the MSSAP interface to provide the MSC1 with the roaming number of the B-subscriber, as well as the call monitor command, described above. In block 1103, the MSC1 routes the call to the B-subscriber. As described in earlier examples, this connection may go through a second MSC, designated MSC2. Upon finding that the B-subscriber is busy, the MSC2 routes this "busy" status information back to MSC1. In block 1104, when the MSC1 receives this status information, it determines that a call monitor command has previously been received for this call. In response to this, the MSC1 uses the MSSAP to send the "busy" status information to the HLR, by means of a supplementary service request. The HLR, after again determining that the B-subscriber is entitled to receive the "time-dependent call forwarding supplementary service," checks the time of day and the parameters for call-forwarding as earlier established by the B-subscriber. If, for example, the B-subscriber designated one call-forwarding number (i.e., a "C-number") for the morning and one for the afternoon, the HLR uses the MSSAP interface to give the MSC1 either the first C-number (block 1105) or the second C-number (block 1106), depending on what time it is. The MSC1 then uses this information, in block 1107, to route the call.

The invention has been described with reference to particular embodiments. However, it will be readily apparent to those skilled in the art that it is possible to embody the invention in specific forms other than those of the preferred embodiments described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a mobile communications system comprising a home location register coupled to a mobile services switching center, a method for providing a supplementary service to a calling subscriber, comprising the steps of:

sending a supplementary service category for the calling subscriber from the home location register to the mobile services switching center;

detecting, in the mobile services switching center, initiation of a call from the calling subscriber and presence of the supplementary service category for the calling subscriber;

sending a supplementary service request from the mobile services switching center to the home location register in response to said detecting step;

receiving the supplementary service request in the home location register, and in response thereto, determining, in the home location register, call routing information in accordance with supplementary service parameters; and sending the call routing information from the home location register to the mobile services switching center.

2. The method of claim 1, wherein the step of determining call routing information comprises translating a short number into a full number corresponding to a called subscriber.

3. In a mobile communications system comprising a home location register coupled to a mobile services switching center, a method for providing a supplementary service to a called subscriber, comprising the steps of:

detecting, in the mobile services switching center, initiation of a call from a calling subscriber to the called subscriber;

sending in response to the detected call initiation, from the mobile services switching center to the home location register, a request for a roaming number corresponding to the called subscriber;

sending in response to the request for a roaming number, from the home location register to the mobile services switching center, the roaming number and a call monitor command for the called subscriber;

using the roaming number in the mobile services switching center to route a call from the calling subscriber to the called subscriber;

detecting, in the mobile services switching center, a status condition and presence of the call monitor command for the called subscriber, the status condition being indicative of non-completion of the call from the calling subscriber to the called subscriber;

sending a supplementary service request and the status condition from the mobile services switching center to the home location register in response to said detecting step;

receiving the supplementary service request and the status condition in the home location register, and in response thereto, determining, in the home location register, supplementary call routing information in accordance with supplementary service parameters; and sending the supplementary call routing information from the home location register to the mobile services switching center.

4. The method of claim 3, wherein the status condition is a busy indication, and the supplementary service is a call forwarding on busy supplementary service.

5. The method of claim 3, wherein the step of determining supplementary call routing information in accordance with supplementary service parameters comprises determining a first supplementary call routing information if the supplementary service request is received during a first time period, and determining a second supplementary call routing information if the supplementary service request is received during a second time period.

6. In a mobile communications system comprising a home location register coupled to a mobile services switching center, a method for providing a supplementary service to a called subscriber, comprising the steps of:

detecting, in the mobile services switching center, initiation of a call from a calling subscriber to the called subscriber;

sending in response to the detected call initiation, from the mobile services switching center to the home location register, a request for a roaming number corresponding to the called subscriber;

detecting, in the home location register in response to the request for a roaming number, an availability condition for the called subscriber;

sending, in response to the detected availability condition, an information request from the home location register to the mobile services switching center;

in the mobile services switching center, in response to receiving the information request, soliciting and subsequently receiving requested information from the calling subscriber;

sending the requested information from the mobile services switching center to the home location register;

using, in the home location register, the requested information to determine supplementary call routing information to a selected destination in accordance with supplementary service parameters;

sending, from the home location register to the mobile services switching center, the supplementary call routing information;

using the supplementary call routing information in the mobile services switching center to route a call from the calling subscriber to the selected destination.

7. The method of claim 6, wherein the requested information received by the mobile services switching center from the calling subscriber is in the form of a dual tone multi-frequency signal.

8. The method of claim 7, wherein the mobile services switching center converts the dual tone multi-frequency signal into a message containing the requested information for sending to the home location register.

9. The method of claim 6, wherein the availability condition indicates that the called subscriber is to receive only an important call, and that an unimportant call is to be routed to an alternative destination.

10. The method of claim 9, wherein the requested information indicates whether the calling subscriber is initiating the important call or the unimportant call.

11. In a mobile communications system comprising a home location register coupled to a mobile services switching center, a system for providing a supplementary service to a calling subscriber, comprising:

means for sending a supplementary service category for the calling subscriber from the home location register to the mobile services switching center;

means for detecting, in the mobile services switching center, initiation of a call from the calling subscriber and presence of the supplementary service category for the calling subscriber;

means, responsive to an output of said means for detecting, for sending a supplementary service request from the mobile services switching center to the home location register;

means for receiving the supplementary service request in the home location register, and in response thereto, determining, in the home location register, call routing information in accordance with supplementary service parameters; and means for sending the call routing information from the home location register to the mobile services switching center.

12. The system of claim 11, wherein the means for determining call routing information comprises means for translating a short number into a full number corresponding to a called subscriber.

13. In a mobile communications system comprising a home location register coupled to a mobile services switching center, a system for providing a supplementary service to a called subscriber, comprising:

means for detecting, in the mobile services switching center, initiation of a call from a calling subscriber to the called subscriber;

means for sending in response to the detected call initiation, from the mobile services switching center to the home location register, a request for a roaming number corresponding to the called subscriber;

means for sending in response to the request for a roaming number, from the home location register to the mobile services switching center, the roaming number and a call monitor command for the called subscriber;

means for using the roaming number in the mobile services switching center to route a call from the calling subscriber to the called subscriber;

means for detecting, in the mobile services switching center, a status condition and presence of the call monitor command for the called subscriber, the status condition being indicative of non-completion of the call from the calling subscriber to the called subscriber;

means, responsive to an output of said means for detecting, for sending a supplementary service request and the status condition from the mobile services switching center to the home location register;

means for receiving the supplementary service request in the home location register, and in response thereto, determining, in the home location register, supplementary call routing information in accordance with supplementary service parameters; and means for sending the supplementary call routing information from the home location register to the mobile services switching center.

14. The system of claim 13, wherein the status condition is a busy indication, and the supplementary service is a call forwarding on busy supplementary service.

15. The system of claim 13, wherein the means for determining supplementary call routing information in accordance with supplementary service parameters comprises means for determining a first supplementary call routing information if the supplementary service request is received during a first time period, and means for determining a second supplementary call routing information if the supplementary service request is received during a second time period.

16. In a mobile communications system comprising a home location register coupled to a mobile services switching center, a system for providing a supplementary service to a called subscriber, comprising:

means for detecting, in the mobile services switching center, initiation of a call from a calling subscriber to the called subscriber;

means for sending in response to the detected call initiation, from the mobile services switching center to the home location register, a request for a roaming number corresponding to the called subscriber;

means for detecting, in the home location register in response to the request for a roaming number, an availability condition for the called subscriber;

means for sending, in response to the detected availability condition, an information request from the home location register to the mobile services switching center;

means, responsive to receiving an information request in the mobile services switching center, for soliciting and subsequently receiving requested information from the calling subscriber;

means for sending the requested information from the mobile services switching center to the home location register;

means for using, in the home location register, the requested information to determine supplementary call routing information to a selected destination in accordance with supplementary service parameters;

means for sending, from the home location register to the mobile services switching center, the supplementary call routing information; and means for using the supplementary call routing information in the mobile services switching center to route a call from the calling subscriber to the selected destination.

17. The system of claim 16, wherein the requested information received by the mobile services switching center from the calling subscriber is in the form of a dual tone multi-frequency signal.

18. The system of claim 17, wherein the means for sending the requested information from the mobile services switching center to the home location register converts the dual tone multi-frequency signal into a message containing the requested information for sending to the home location register.

19. The system of claim 16, wherein the availability condition indicates that the called subscriber is to receive only an important call, and that an unimportant call is to be routed to an alternative destination.

20. The system of claim 19, wherein the requested information indicates whether the calling subscriber is initiating the important call or the unimportant call.

21. A mobile services switching center, comprising:

means for receiving, from the home location register, a supplementary service category for a calling subscriber;

means for detecting initiation of a call from the calling subscriber and presence of the supplementary service category for the calling subscriber;

means, responsive to an output of said means for detecting, for sending a supplementary service request from the mobile services switching center to the home location register;

means for receiving, from the home location register, call routing information that has been determined in accordance with supplementary service parameters.

22. The mobile services switching center of claim 21, wherein initiation of a call from a calling subscriber includes receiving a short number corresponding to a called subscriber, and wherein the call routing information is a full number corresponding to the called subscriber.

23. A mobile services switching center, comprising:

means for detecting initiation of a call from a calling subscriber to a called subscriber;

means for sending in response to the detected call initiation, from the mobile services switching center to a home location register, a request for a roaming number corresponding to the called subscriber;

means for receiving, from the home location register, the roaming number and a call monitor command for the called subscriber;

means for using the roaming number to route a call from the calling subscriber to the called subscriber;

means for detecting a status condition and presence of the call monitor command for the called subscriber, the status condition being indicative of non-completion of the call from the calling subscriber to the called subscriber;

means, responsive to an output of said means for detecting, for sending a supplementary service request and the status condition from the mobile services switching center to the home location register; and means for receiving, from the home location register, supplementary call routing information that is determined in accordance with supplementary service parameters.

24. The mobile services switching center of claim 23, wherein the status condition is a busy indication, and the supplementary service is a call forwarding on busy supplementary service.

25. The mobile services switching center of claim 23, wherein the supplementary call routing information is a first supplementary call routing information if the supplementary service request is sent during a first time period, and a second supplementary call routing information if the supplementary service request is sent during a second time period.

26. A mobile services switching center, comprising:

means for detecting initiation of a call from a calling subscriber to a called subscriber;

means for sending to a home location register in response to the detected call initiation, a request for a roaming number corresponding to the called subscriber;

means for receiving an information request from the home location register;

means, responsive to receiving an information request, for soliciting and subsequently receiving requested information from the calling subscriber;

means for sending the requested information from the mobile services switching center to the home location register;

means for receiving, from the home location register, supplementary call routing information to a destination that is selected in response to the requested information; and means for using the supplementary call routing information in the mobile services switching center to route a call from the calling subscriber to the selected destination.

27. The mobile services switching center of claim 26, wherein the requested information received by the mobile services switching center from the calling subscriber is in the form of a dual tone multi-frequency signal.

28. The mobile services switching center of claim 27, wherein the means for sending the requested information from the mobile services switching center to the home location register converts the dual tone multi-frequency signal into a message containing the requested information for sending to the home location register.

29. The mobile services switching center of claim 26, wherein the requested information indicates whether the calling subscriber is initiating an important call or an unimportant call.

30. A home location register, comprising:

means for receiving a supplementary service request from a mobile services switching center, the supplementary service request indicating that a calling subscriber is initiating a call;

means, responsive to receipt of the supplementary service request, for determining call routing information in accordance with supplementary service parameters; and means for sending the call routing information from the home location register to the mobile services switching center.

31. The home location register of claim 30, wherein the means for determining call routing information comprises means for translating a short number into a full number corresponding to a called subscriber.

32. A home location register, comprising:

means for receiving, from a mobile services switching center, a request for a roaming number corresponding to a called subscriber;

means, responsive to the roaming number request means, for determining that the called subscriber is to receive a called subscriber supplementary service;

means, responsive to an output of the determining means, for sending, to the mobile services switching center, the roaming number for routing a call from a calling subscriber to the called subscriber, and a call monitor command for the called subscriber;

means for receiving, from the mobile services switching center, a supplementary service request and a status condition indicative of non-completion of the call from the calling subscriber to the called subscriber;

means, responsive to an output of the supplementary service request receiving means, for determining supplementary call routing information in accordance with supplementary service parameters; and means for sending the supplementary call routing information from the home location register to the mobile services switching center.

33. The home location register of claim 32, wherein the status condition is a busy indication, and the supplementary service parameters correspond to a call forwarding on busy supplementary service.

34. The home location register of claim 32, wherein the means for determining supplementary call routing information in accordance with supplementary service parameters comprises means for determining a first supplementary call routing information if the supplementary service request is received during a first time period, and means for determining a second supplementary call routing information if the supplementary service request is received during a second time period.

35. A home location register, comprising:

means for receiving, from the mobile services switching center, a request for a roaming number corresponding to a called subscriber;

means for detecting, in response to an output of the roaming number request receiving means, an availability condition for the called subscriber;

means for sending, in response to the detected availability condition, an information request from the home location register to the mobile services switching center;

means for receiving the requested information from the mobile services switching center;

means for using the requested information to determine supplementary call routing information to a selected destination in accordance with supplementary service parameters; and means for sending the supplementary call routing information to the mobile services switching center.

36. The home location register of claim 35, wherein the availability condition indicates that the called subscriber is to receive only an important call, and that an unimportant call is to be routed to an alternative destination.

37. The home location register of claim 36, wherein the requested information indicates whether the calling subscriber is initiating the important call or the unimportant call.

* * * * *